(12) United States Patent
Hashimoto

(10) Patent No.: US 8,002,055 B2
(45) Date of Patent: Aug. 23, 2011

(54) POWER OUTPUT APPARATUS, CONTROL METHOD OF POWER OUTPUT APPARATUS, AND VEHICLE EQUIPPED WITH POWER OUTPUT APPARATUS

(75) Inventor: Toshiya Hashimoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 924 days.

(21) Appl. No.: 11/794,116

(22) PCT Filed: Nov. 13, 2006

(86) PCT No.: PCT/JP2006/323049
§ 371 (c)(1),
(2), (4) Date: Jun. 25, 2007

(87) PCT Pub. No.: WO2007/058330
PCT Pub. Date: May 24, 2007

(65) Prior Publication Data
US 2008/0289889 A1    Nov. 27, 2008

(30) Foreign Application Priority Data

Nov. 17, 2005  (JP) .................................. 2005-332800

(51) Int. Cl.
*B60K 6/20* (2007.10)
*B60W 20/00* (2006.01)
(52) U.S. Cl. ............................. 180/65.21; 180/65.265
(58) Field of Classification Search .................. 180/297, 180/65.21, 65.22, 65.25, 65.265, 65.275, 180/65.28, 65.29; 903/902, 903, 904, 905, 903/906, 915, 930, 951, 952
See application file for complete search history.

(56) References Cited

U.S. PATENT DOCUMENTS

| | | | |
|---|---|---|---|
| 5,806,617 A | 9/1998 | Yamaguchi | |
| 5,844,342 A * | 12/1998 | Miyatani et al. | 310/114 |
| 6,336,063 B1 | 1/2002 | Lennevi | |
| 6,553,287 B1 | 4/2003 | Supina et al. | |
| 7,117,964 B1 * | 10/2006 | Kuang et al. | 180/65.22 |
| 2003/0074115 A1 * | 4/2003 | Yamaguchi et al. | 701/22 |
| 2004/0231897 A1 * | 11/2004 | Kimura et al. | 180/65.2 |
| 2006/0161328 A1 * | 7/2006 | Hoshiba et al. | 701/84 |

FOREIGN PATENT DOCUMENTS

| | | |
|---|---|---|
| JP | A 2004-343838 | 12/2004 |
| JP | A 2005-39880 | 2/2005 |
| WO | WO 2005/005188 A1 | 1/2005 |
| WO | WO 2005005188 A1 * | 1/2005 |

* cited by examiner

*Primary Examiner* — Terrell McKinnon
*Assistant Examiner* — Chiedu A Chibogu
(74) *Attorney, Agent, or Firm* — Oliff & Berridge, PLC

(57) ABSTRACT

The drive control process of the invention sets minimum and maximum control rotation speeds Necmin and Necmax to a minimum engine speed Nemin and a maximum engine speed Ncmax of an engine. When output of a torque demand Tr* to a driveshaft is attainable, the drive control process performs the control to ensure output of the torque demand Tr* to the driveshaft in the range of the minimum control rotation speed Necmin and the maximum control rotation speed Necmax. When the output of the preset torque demand Tr* to the driveshaft is unattainable, the drive control process sets a performance-based minimum rotation speed Nmin and a performance-based maximum rotation speed Nrnax to the minimum engine speed Nemin and the maximum engine speed Nemax of the engine and repeats the series of control.

11 Claims, 9 Drawing Sheets

POWER OUTPUT APPARATUS, CONTROL METHOD OF POWER OUTPUT APPARATUS, AND VEHICLE EQUIPPED WITH POWER OUTPUT APPARATUS

TECHNICAL FIELD

The present invention relates to a power output apparatus, a control method of the power output apparatus, and a vehicle equipped with the power output apparatus.

BACKGROUND ART

One proposed structure of a power output apparatus includes an engine, a planetary gear unit including a carrier and a ring gear respectively connected with a crankshaft of the engine and with a driveshaft mechanically linked to an axle of a vehicle, a first motor arranged to input and output power from and to a sun gear of the planetary gear unit, a second motor arranged to input and output power from and to the driveshaft, and a battery designed to transmit electric power to and from the first motor and the second motor (see, for example, Japanese Patent Laid-Open Gazette No. 2005-39880). This proposed power output apparatus inputs and outputs a power from and to the driveshaft via the ring gear based on the power input from the engine to the carrier and the power input from the first motor to the sun gear, while controlling the second motor to input and output a power from and to the driveshaft.

DISCLOSURE OF THE INVENTION

In the event of an abrupt change of a driving force demand required for the driveshaft, this prior art power output apparatus quickly varies a driving force level of the second motor to respond to the abrupt change. The quick variation of the driving force level of the second motor may, however, be not allowed by preset input and output limits of the battery, which transmits the electric power to and from the first motor and the second motor. In this state, this power output apparatus can not respond to the abrupt change of the driving force demand required for the driveshaft. One applicable measure for responding to the abrupt change of the driving force demand required for the driveshaft controls the first motor to quickly vary the rotation speed of the engine and thus immediately change the power input and output from and to the driveshaft via the planetary gear unit. The quick variation of the rotation speed of the engine may, however, be not allowed due to the performance limitation of the engine and other relevant devices. In such cases, the method of quickly varying the rotation speed of the engine is not adoptable as a response to the abrupt change of the driving force demand required for the driveshaft.

The power output apparatus of the invention, the motor vehicle equipped with the power output apparatus, and the control method of the power output apparatus thus aim to quickly respond to an abrupt change of a driving force demand. The power output apparatus of the invention, the motor vehicle equipped with the power output apparatus, and the control method of the power output apparatus also aim to prepare for an abrupt change of a driving force demand according to the state of an accumulator unit, such as a secondary battery.

In order to attain at least part of the above and the other related objects, the power output apparatus of the invention, the vehicle equipped with the power output apparatus, and the control method of the power output apparatus have the configurations discussed below.

The present invention is directed to a power output apparatus that outputs power to a driveshaft. The power output apparatus includes: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; an accumulator unit that transmits electric power to and from the electric power-mechanical power input output mechanism and the motor; an input/output limits setting module that sets input and output limits of the accumulator unit as chargeable and dischargeable maximum and minimum electric powers in and from the accumulator unit, according to a state of charge of the accumulator unit; a maximum/minimum control rotation speeds setting module that sets maximum and minimum control rotation speeds as upper limit and lower limit control rotation speeds of the internal combustion engine, based on the set input and output limits of the accumulator unit; a driving force demand specification module that specifies a driving force demand required for the driveshaft; and a control module. When output of the specified driving force demand to the driveshaft with a variation in rotation speed of the internal combustion engine is attainable in a control restriction range defined by the set input and output limits of the accumulator unit and the set maximum and minimum control rotation speeds, the control module controls the internal combustion engine, the electric power-mechanical power input output mechanism, and the motor to enable the specified driving force demand to be output to the driveshaft in the control restriction range. When the output of the specified driving force demand to the driveshaft with the variation in rotation speed of the internal combustion engine is unattainable in the control restriction range, the control module controls the internal combustion engine, the electric power-mechanical power input output mechanism, and the motor to enable a preset driving force, which depends upon the specified driving force demand, to be output to the driveshaft in a performance-based restriction range, where the performance-based restriction range is defined by the set input and output limits of the accumulator unit and performance-based maximum and minimum rotation speeds as performance-dependent upper limit rotation speed and lower limit rotation speed of the internal combustion engine.

The power output apparatus of the invention sets the input and output limits, as the chargeable and dischargeable maximum and minimum electric powers in and from the accumulator unit, according to a state of charge of the accumulator unit, and sets the maximum and minimum control rotation speeds as the upper limit and lower limit control rotation speeds of the internal combustion engine based on the set input and output limits. When the output of the specified driving force demand to the driveshaft with a variation in rotation speed of the internal combustion engine is attainable in the control restriction range defined by the set input and output limits of the accumulator unit and the set maximum and minimum control rotation speeds, the internal combustion engine, the electric power-mechanical power input output mechanism, and the motor are controlled to enable the specified driving force demand to be output to the driveshaft in the control restriction range. In this control mode, the specified driving force demand can be output to the driveshaft in the control restriction range. When the output of the specified driving force demand to the driveshaft is unattainable in the control restriction range, the internal combustion engine, on the other hand, the electric power-mechanical power input output mechanism, and the motor are controlled to enable a preset driving force, which depends upon the specified driving force demand, to be output to the driveshaft with a variation in rotation speed of the internal combustion engine in the performance-based restriction range. The performance-based restriction range is defined by the set input and output limits of the accumulator unit and the performance-based maximum and minimum rotation speeds as the performance-dependent upper limit rotation speed and lower limit rotation speed of the internal combustion engine. In this control mode, the preset driving force corresponding to the specified driving force demand can be output to the driveshaft in the performance-based restriction range. The performance-based restriction range is wider than the control restriction range. In the event of an abrupt change of the driving force demand, output of the abruptly changed driving force demand to the driveshaft may be unattainable in the control restriction range. In this case, the internal combustion engine, the electric power-mechanical power input output mechanism, and the motor are controlled to ensure output of a driving force closer to the driving force demand to the driveshaft in the performance-based restriction range. When output of the driving force demand to the driveshaft is attainable in the control restriction range, the control is performed to ensure the output in the control restriction range. This effectively prepares for a possible failure in output of the driving force demand to the driveshaft in the control restriction range. The control restriction range is set according to the input limit and the output limit of the accumulator unit. Namely the provision is based on the input limit and the output limit of the accumulator unit.

In one preferable embodiment of the invention, the control module controls the internal combustion engine, the electric power-mechanical power input output mechanism, and the motor to ensure output of the driving force demand to the driveshaft with using a power input or output with a varying rotation speed of the internal combustion engine. The power output apparatus uses a power input or output with a varying rotation speed of the internal combustion engine to ensure output of the driving force demand to the driveshaft. A shift of the control status from the control mode in the control restriction range to the control mode in the performance-based restriction range extends the allowable variation range of the rotation speed of the internal combustion engine, thus increasing the input and output power level. This arrangement ensures output of a driving force further closer to the driving force demand to the driveshaft.

In another preferable embodiment of the invention, the maximum/minimum control rotation speeds setting module sets the minimum control rotation speed to increase with a decrease in absolute value of the set output limit of the accumulator unit. The power output apparatus sets the minimum control rotation speed to increase with a decrease in absolute value of the set output limit of the accumulator unit. This increases a rotation speed difference between the minimum control rotation speed and the performance-based minimum rotation speed and thus provides a greater margin for an abrupt decrease in rotation speed of the internal combustion engine driven at the minimum control rotation speed. The abrupt decrease in rotation speed of the internal combustion engine quickly enhances the driving force output to the driveshaft. In the event of failed output of the driving force demand to the driveshaft in the control restriction range due to the output limit of the accumulator unit, such control in the performance-based restriction range enables a driving force further closer to the driving force demand to be output to the driveshaft.

In still another preferable embodiment of the invention, the maximum/minimum control rotation speeds setting module sets the maximum control rotation speed to decrease with a decrease in absolute value of the set input limit of the accumulator unit. The power output apparatus sets the maximum control rotation speed to decrease with a decrease in absolute value of the set input limit of the accumulator unit. This increases a rotation speed difference between the maximum control rotation speed and the performance-based maximum rotation speed and thus provides a greater margin for an abrupt increase in rotation speed of the internal combustion engine driven at the maximum control rotation speed. The abrupt increase in rotation speed of the internal combustion engine quickly reduces the driving force output to the driveshaft. In the event of failed output of the driving force demand to the driveshaft in the control restriction range due to the input limit of the accumulator unit, such control in the performance-based restriction range enables a driving force further closer to the driving force demand to be output to the driveshaft.

In still another preferable embodiment of the invention, the electric power-mechanical power input output mechanism includes: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

The present invention is also directed to a vehicle. The vehicle includes: an internal combustion engine; an electric power-mechanical power input output mechanism that is connected with an output shaft of the internal combustion engine and with a driveshaft that is linked to an axle and inputs and outputs power from and to the output shaft and the driveshaft through input and output of electric power and mechanical power; a motor that is capable of inputting and outputting power from and to the driveshaft; an accumulator unit that transmits electric power to and from the electric power-mechanical power input output mechanism and the motor; an input/output limits setting module that sets input and output limits of the accumulator unit as chargeable and dischargeable maximum and minimum electric powers in and from the accumulator unit, according to a state of charge of the accumulator unit; a maximum/minimum control rotation speeds setting module that sets maximum and minimum control rotation speeds as upper limit and lower limit control rotation speeds of the internal combustion engine, based on the set input and output limits of the accumulator unit; a driving force demand specification module that specifies a driving force demand required for the driveshaft; and a control module. When output of the specified driving force demand to the driveshaft with a variation in rotation speed of the internal combustion engine is attainable in a control restriction range defined by the set input and output limits of the accumulator unit and the set maximum and minimum control rotation speeds, the control module controls the internal combustion engine, the electric power-mechanical power input output mechanism, and the motor to enable the specified driving force demand to be output to the driveshaft in the control-restriction range. When the output of the specified driving force demand to the driveshaft with the variation in rotation speed of the internal combustion engine is unattainable in the control restriction range, the control module controls the internal combustion engine, the electric power-mechanical power input output mechanism, and the motor to enable a preset driving force, which depends upon the specified driving force demand, to be output to the driveshaft in a performance-based restriction range, where the performance-based restriction range is defined by the set input and output limits of the accumulator unit and performance-based maximum and minimum rotation speeds as performance-dependent upper limit rotation speed and lower limit rotation speed of the internal combustion engine.

The vehicle of the invention sets the input and output limits, as the chargeable and dischargeable maximum and minimum electric powers in and from the accumulator unit, according to a state of charge of the accumulator unit, and sets the maximum and minimum control rotation speeds as the upper limit and lower limit control rotation speeds of the internal combustion engine based on the set input and output limits. When the output of the specified driving force demand to the driveshaft with a variation in rotation speed of the internal combustion engine is attainable in the control restriction range defined by the set input and output limits of the accumulator unit and the set maximum and minimum control rotation speeds, the internal combustion engine, the electric power-mechanical power input output mechanism, and the motor are controlled to enable the specified driving force demand to be output to the driveshaft in the control restriction range. In this control mode, the specified driving force demand can be output to the driveshaft in the control restriction range. When the output of the specified driving force demand to the driveshaft is unattainable in the control restriction range, the internal combustion engine, on the other hand, the electric power-mechanical power input output mechanism, and the motor are controlled to enable a preset driving force, which depends upon the specified driving force demand, to be output to the driveshaft with a variation in rotation speed of the internal combustion engine in the performance-based restriction range. The performance-based restriction range is defined by the set input and output limits of the accumulator unit and the performance-based maximum and minimum rotation speeds as the performance-dependent upper limit rotation speed and lower limit rotation speed of the internal combustion engine. In this control mode, the preset driving force corresponding to the specified driving force demand can be output to the driveshaft in the performance-based restriction range. The performance-based restriction range is wider than the control restriction range. In the event of an abrupt change of the driving force demand, output of the abruptly changed driving force demand to the driveshaft may be unattainable in the control restriction range. In this case, the internal combustion engine, the electric power-mechanical power input output mechanism, and the motor are controlled to ensure output of a driving force closer to the driving force demand to the driveshaft in the performance-based restriction range. When output of the driving force demand to the driveshaft is attainable in the control restriction range, the control is performed to ensure the output in the control restriction range. This effectively prepares for a possible failure in output of the driving force demand to the driveshaft in the control restriction range. The control restriction range is set according to the input limit and the output limit of the accumulator unit. Namely the provision is based on the input limit and the output limit of the accumulator unit.

In one preferable embodiment of the invention, the control module controls the internal combustion engine, the electric power-mechanical power input output mechanism, and the motor to ensure output of the driving force demand to the driveshaft with using a power input or output with a varying rotation speed of the internal combustion engine. The power output apparatus uses a power input or output with a varying rotation speed of the internal combustion engine to ensure output of the driving force demand to the driveshaft. A shift of the control status from the control mode in the control restriction range to the control mode in the performance-based restriction range extends the allowable variation range of the rotation speed of the internal combustion engine, thus increasing the input and output power level. This arrangement ensures output of a driving force further closer to the driving force demand to the driveshaft.

In another preferable embodiment of the invention, the maximum/minimum control rotation speeds setting module sets the minimum control rotation speed to increase with a decrease in absolute value of the set output limit of the accumulator unit. The power output apparatus sets the minimum control rotation speed to increase with a decrease in absolute value of the set output limit of the accumulator unit. This increases a rotation speed difference between the minimum control rotation speed and the performance-based minimum rotation speed and thus provides a greater margin for an abrupt decrease in rotation speed of the internal combustion engine driven at the minimum control rotation speed. The abrupt decrease in rotation speed of the internal combustion engine quickly enhances the driving force output to the driveshaft. In the event of failed output of the driving force demand to the driveshaft in the control restriction range due to the output limit of the accumulator unit, such control in the performance-based restriction range enables a driving force further closer to the driving force demand to be output to the driveshaft.

In still another preferable embodiment of the invention, the maximum/minimum control rotation speeds setting module sets the maximum control rotation speed to decrease with a decrease in absolute value of the set input limit of the accumulator unit. The power output apparatus sets the maximum control rotation speed to decrease with a decrease in absolute value of the set input limit of the accumulator unit. This increases a rotation speed difference between the maximum control rotation speed and the performance-based maximum rotation speed and thus provides a greater margin for an abrupt increase in rotation speed of the internal combustion engine driven at the maximum control rotation speed. The abrupt increase in rotation speed of the internal combustion engine quickly reduces the driving force output to the driveshaft. In the event of failed output of the driving force demand to the driveshaft in the control restriction range due to the input limit of the accumulator unit, such control in the performance-based restriction range enables a driving force further closer to the driving force demand to be output to the driveshaft.

In still another preferable embodiment of the invention, the electric power-mechanical power input output mechanism includes: a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

The present invention is also directed to a control method of a power output apparatus. The power output apparatus includes: an internal combustion engine; an electric power-mechanical power input output mechanism that is connected with an output shaft of the internal combustion engine and with the driveshaft and inputs and outputs power from and to the output shaft and the driveshaft through input and output of electric power and mechanical power; a motor that is capable of inputting and outputting power from and to the driveshaft; and an accumulator unit that transmits electric power to and from the electric power-mechanical power input output mechanism and the motor. The control method including the steps of: (a) setting input and output limits of the accumulator unit as chargeable and dischargeable maximum and minimum electric powers in and from the accumulator unit, according to a state of charge of the accumulator unit, and setting maximum and minimum control rotation speeds as upper limit and lower limit control rotation speeds of the internal combustion engine, based on the set input and output limits of the accumulator unit; and (b) when output of a specified driving force demand to the driveshaft with a variation in rotation speed of the internal combustion engine is attainable in a control restriction range defined by the set input and output limits of the accumulator unit and the set maximum and minimum control rotation speeds, controlling the internal combustion engine, the electric power-mechanical power input output mechanism, and the motor to enable the specified driving force demand to be output to the driveshaft in the control restriction range, when the output of the specified driving force demand to the driveshaft with the variation in rotation speed of the internal combustion engine is unattainable in the control restriction range, controlling the internal combustion engine, the electric power-mechanical power input output mechanism, and the motor to enable a preset driving force, which depends upon the specified driving force demand, to be output to the driveshaft in a performance-based restriction range, where the performance-based restriction range is defined by the set input and output limits of the accumulator unit and performance-based maximum and minimum rotation speeds as performance-dependent upper limit rotation speed and lower limit rotation speed of the internal combustion engine.

The control method of a power output apparatus of the invention sets the input and output limits, as the chargeable and dischargeable maximum and minimum electric powers in and from the accumulator unit, according to a state of charge of the accumulator unit, and sets the maximum and minimum control rotation speeds as the upper limit and lower limit control rotation speeds of the internal combustion engine based on the set input and output limits. When the output of the specified driving force demand to the driveshaft with a variation in rotation speed of the internal combustion engine is attainable in the control restriction range defined by the set input and output limits of the accumulator unit and the set maximum and minimum control rotation speeds, the internal combustion engine, the electric power-mechanical power input output mechanism, and the motor are controlled to enable the specified driving force demand to be output to the driveshaft in the control restriction range. In this control mode, the specified driving force demand can be output to the driveshaft in the control restriction range. When the output of the specified driving force demand to the driveshaft is unattainable in the control restriction range, the internal combustion engine, on the other hand, the electric power-mechanical power input output mechanism, and the motor are controlled to enable a preset driving force, which depends upon the specified driving force demand, to be output to the driveshaft with a variation in rotation speed of the internal combustion engine in the performance-based restriction range. The performance-based restriction range is defined by the set input and output limits of the accumulator unit and the performance-based maximum and minimum rotation speeds as the performance-dependent upper limit rotation speed and lower limit rotation speed of the internal combustion engine. In this control mode, the preset driving force corresponding to the specified driving force demand can be output to the driveshaft in the performance-based restriction range. The performance-based restriction range is wider than the control restriction range. In the event of an abrupt change of the driving force demand, output of the abruptly changed driving force demand to the driveshaft may be unattainable in the control restriction range. In this case, the internal combustion engine, the electric power-mechanical power input output mechanism, and the motor are controlled to ensure output of a driving force closer to the driving force demand to the driveshaft in the performance-based restriction range. When output of the driving force demand to the driveshaft is attainable in the control restriction range, the control is performed to ensure the output in the control restriction range. This effectively prepares for a possible failure in output of the driving force demand to the driveshaft in the control restriction range. The control restriction range is set according to the input limit and the output limit of the accumulator unit. Namely the provision is based on the input limit and the output limit of the accumulator unit.

BEST MODES OF CARRYING OUT THE INVENTION

Figure 1:
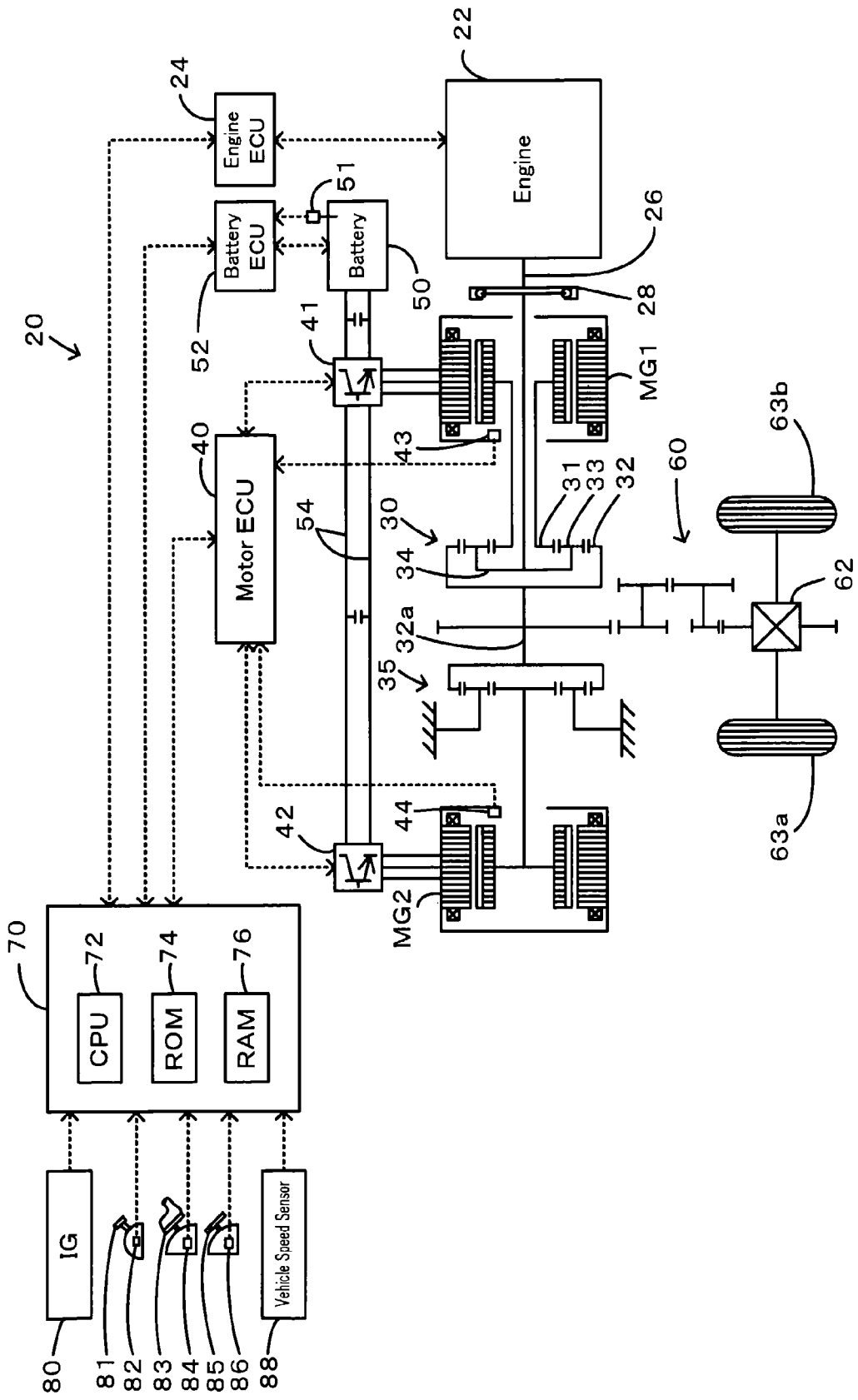
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 with a power output apparatus mounted thereon in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
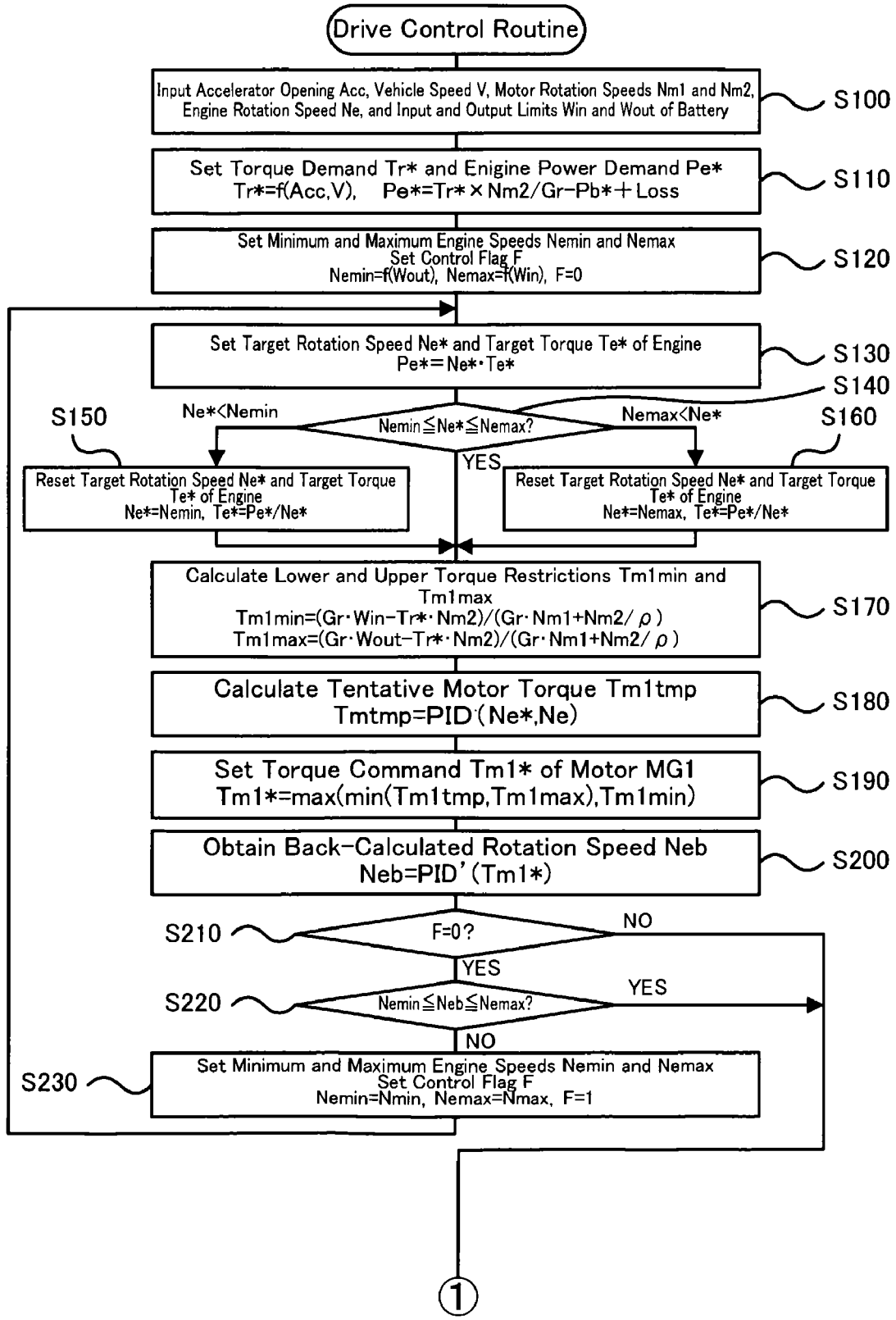
FIG. 2 is the first half of a flowchart showing a drive control routine executed by a hybrid electronic control unit mounted on the hybrid vehicle of the embodiment.
Figure 3:
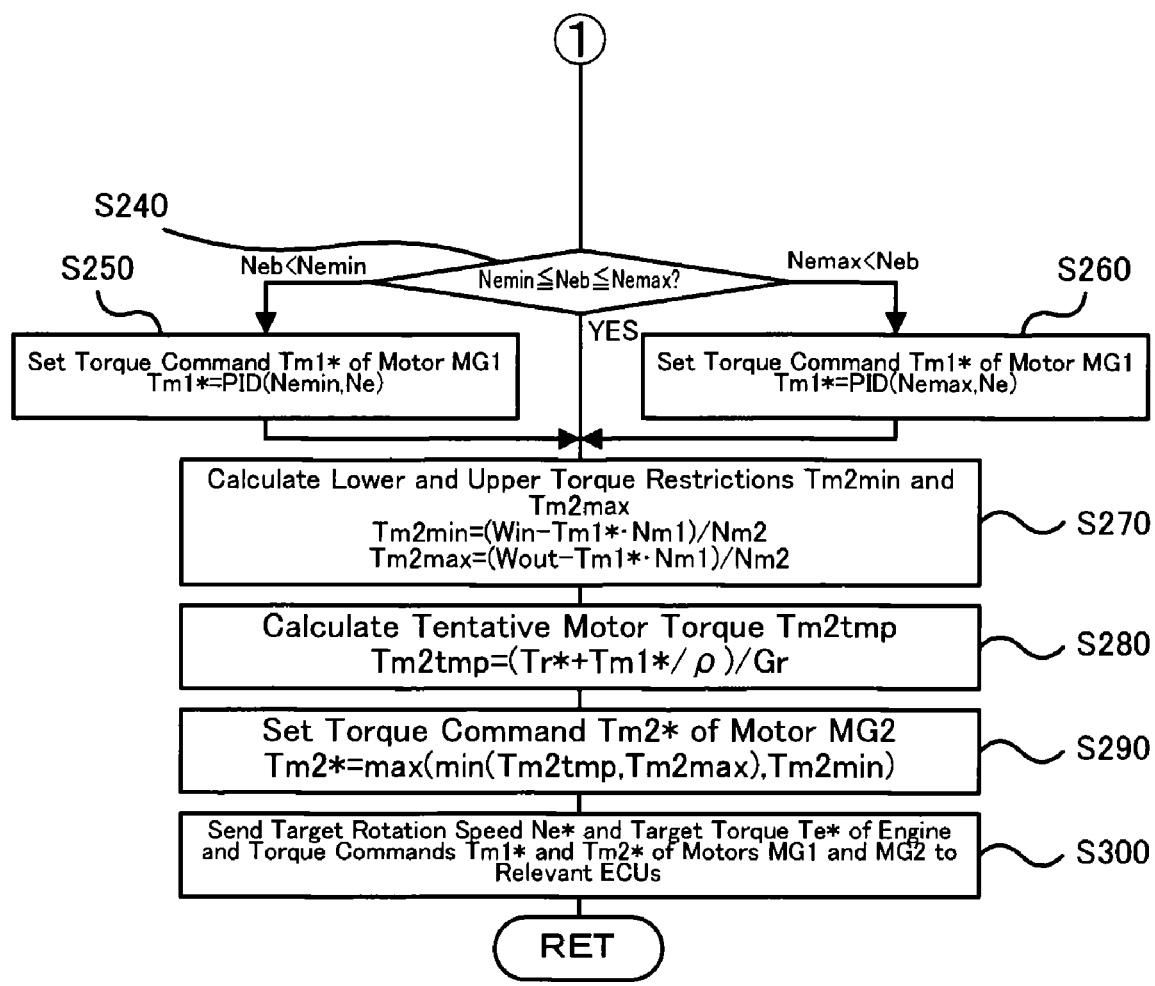
FIG. 3 is the latter half of a flowchart showing a drive control routine executed by a hybrid electronic control unit mounted on the hybrid vehicle of the embodiment.

The description regards the operations of the hybrid vehicle 20 of the embodiment having the configuration discussed above. FIGS. 2 and 3 is a flowchart showing a drive control routine executed by the hybrid electronic control unit 70 in the hybrid vehicle 20 of the embodiment. This drive control routine is performed repeatedly at preset time intervals, for example, at every several msec.

Figure 4:
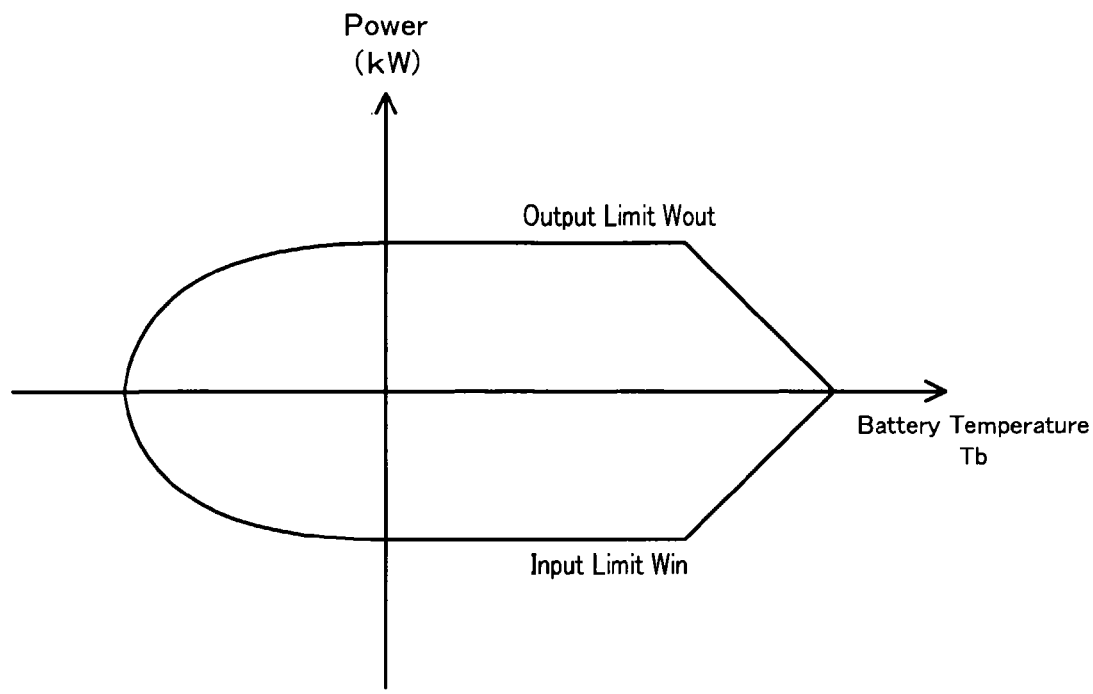
FIG. 4 shows variations of an input limit Win and an output limit Wout against battery temperature Tb of a battery.
Figure 5:
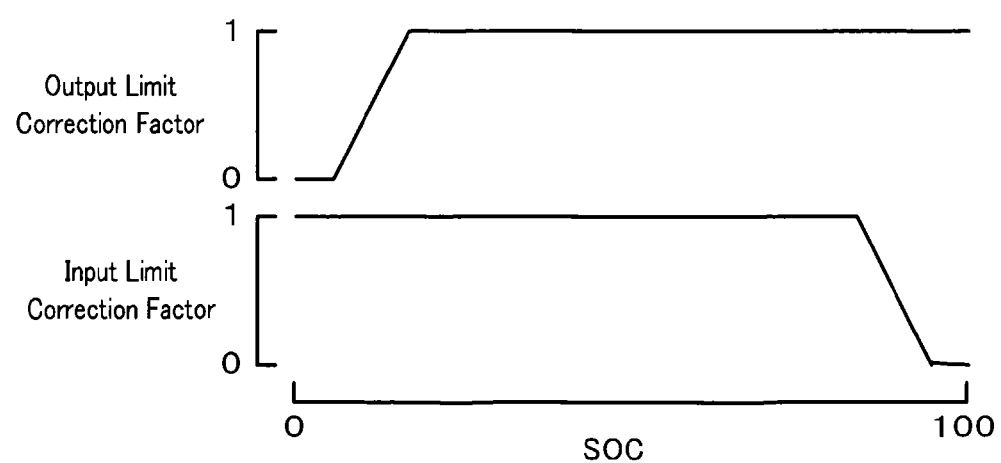
FIG. 5 shows variations of an input limit correction factor and an output limit correction factor against the state of charge SOC of the battery.

In the drive control routine of FIGS. 2 and 3, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a rotation speed Ne of the engine 22, and an input limit Win and an output limit Wout of the battery 50 (step S100). The rotation speed Ne of the engine 22 is computed from a detection signal of a crank position sensor (not shown) attached to the crankshaft 26 and is received from the engine ECU 24 by communication. The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The input limit Win and the output limit Wout of the battery 50 are set based on the battery temperature Tb of the battery 50 measured by the temperature sensor 51 and the state of charge SOC of the battery 50 and are received from the battery ECU 52 by communication. A concrete procedure of computing the input and output limits Win and Wout of the battery 50 sets base values of the input limit Win and the output limit Wout corresponding to the battery temperature Tb, specifies an input limit correction factor and an output limit correction factor corresponding to the state of charge SOC of the battery 50, and multiplies the base values of the input limit Win and the output limit Wout by the specified input limit correction factor and output limit correction factor to determine the input limit Win and the output limit Wout of the battery 50. FIG. 4 shows variations of the input limit Win and the output limit Wout against the battery temperature Tb. FIG. 5 shows variations of the input limit correction factor and the output limit correction factor against the state of charge SOC of the battery 50.

Figure 6:
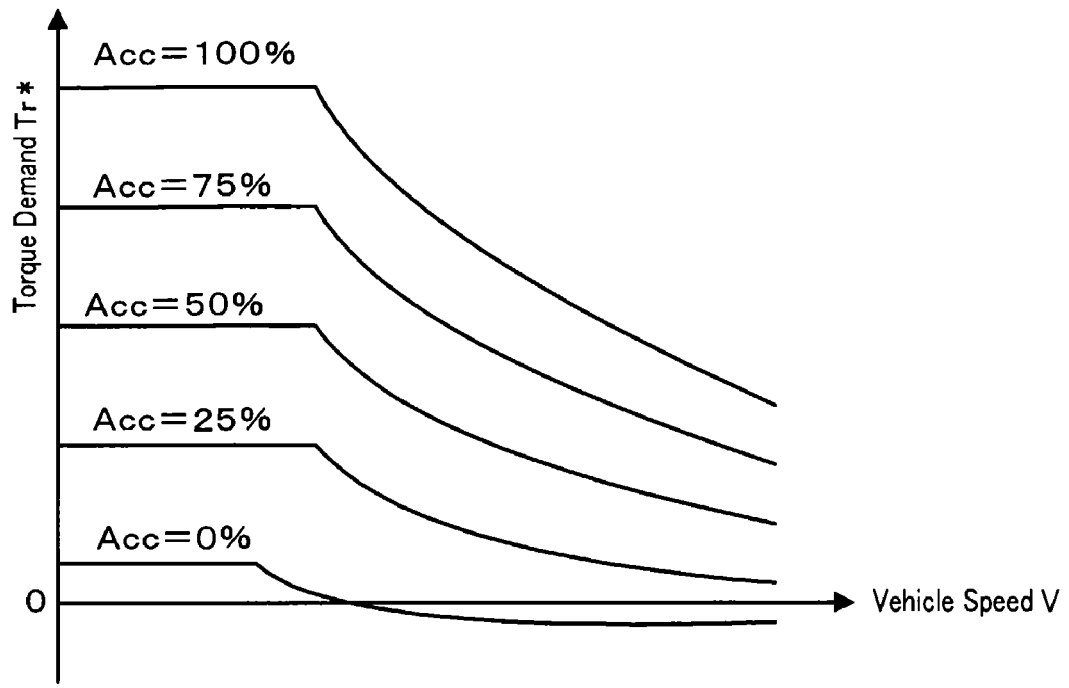
FIG. 6 shows one example of a torque demand setting map.

After the data input, the CPU 72 sets a torque demand Tr* to be output to the ring gear shaft 32a or a driveshaft linked with the drive wheels 63a and 63b as a torque required for the hybrid vehicle 20 and an engine power demand Pe* to be output from the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 6. The engine power demand Pe* is calculated as the sum of the product of the torque demand Tr* and a rotation speed Nr of the ring gear shaft 32a, a charge-discharge power demand Pb* to be charged into or discharged from the battery 50, and a potential loss. The rotation speed Nr of the ring gear shaft 32a is obtained by multiplying the vehicle speed V by a preset conversion factor k or by dividing the rotation speed Nm2 of the motor MG2 by a gear ratio Gr of the reduction gear 35.

Figure 7:
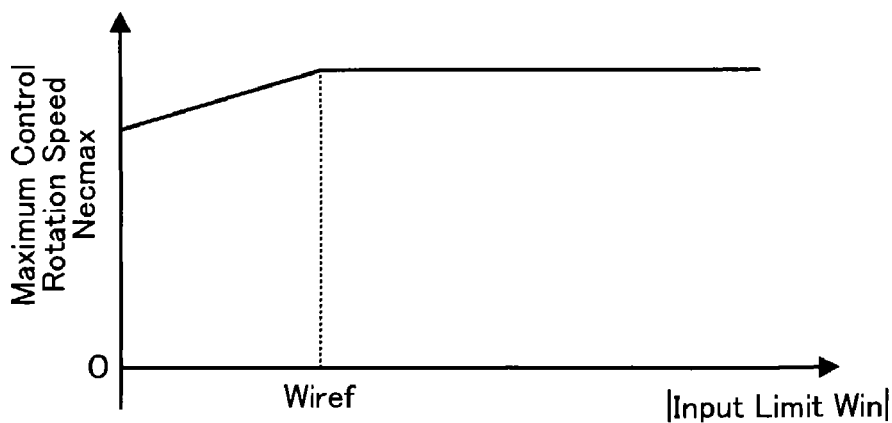
FIG. 7 shows one example of a maximum control rotation speed setting map.
Figure 8:
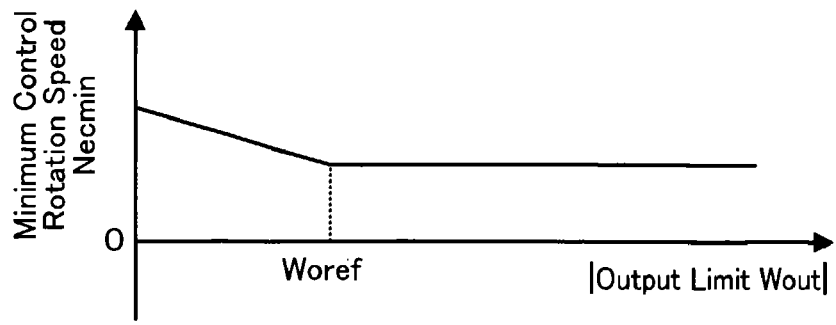
FIG. 8 shows one example of a minimum control rotation speed setting map.

The CPU 72 sets a minimum control rotation speed Necmin and a maximum control rotation speed Necmax, which depend on the input limit Win and the output limit Wout of the battery 50, to a minimum engine speed Nemin and a maximum engine speed Nemax of the engine 22 and sets an initial value '0' to a control flag F (step S120). A concrete procedure of specifying the maximum control rotation speed Necmax in this embodiment stores in advance a variation in maximum control rotation speed Necmax against the absolute value of the input limit Win of the battery 50 as a maximum control rotation speed setting map in the ROM 74 and reads the maximum control rotation speed Necmax corresponding to the given input limit Win from this maximum control rotation speed setting map. One example of the maximum control rotation speed setting map is shown in FIG. 7. In the map of FIG. 7, the maximum control rotation speed Necmax is fixed to a performance-based maximum rotation speed Nmax as an allowable upper limit rotation speed of the engine 22 on the basis of the performances of the engine 22 and the motor MG1 in a specific upper range where the absolute value of the input limit Win of the battery 50 is not lower than a preset reference value Wiref. The maximum control rotation speed Necmax tends to increase with an increase in absolute value of the input limit Win in a remaining lower range where the absolute value of the input limit win of the battery 50 is lower than the preset reference value Wiref. A concrete procedure of specifying the minimum control rotation speed Necmin in this embodiment stores in advance a variation in minimum control rotation speed Necmin against the absolute value of the output limit Wout of the battery 50 as a minimum control rotation speed setting map in the ROM 74 and reads the minimum control rotation speed Necmin corresponding to the given output limit Wout from this minimum control rotation speed setting map. One example of the minimum control rotation speed setting map is shown in FIG. 8. In the map of FIG. 8, the minimum control rotation speed Necmin is fixed to a performance-based minimum rotation speed Nmin as an allowable lower limit rotation speed of the engine 22 on the basis of the performances of the engine 22 and the motor MG1 in a specific upper range where the absolute value of the output limit Wout of the battery 50 is not lower than a preset reference value Woref. The minimum control rotation speed Necmin tends to decrease with an increase in absolute value of the output limit Wout in a remaining lower range where the absolute value of the output limit Wout of the battery 50 is lower than the preset reference value Woref. The control flag F is reset to 0 at step S120 in every cycle of the drive control routine of FIGS. 2 and 3. The control flag F is set to 1 (step S230) in response to a shift of the control status from an ordinary control mode for the control in a range of the minimum control rotation speed Necmin and the maximum control rotation speed Necmax, which are inside a range of the performance-based minimum rotation speed Nmin and the performance-based maximum rotation speed Nmax, to a specific control mode for the control in the range of the performance-based minimum rotation speed Nmin and the performance-based maximum rotation speed Nmax as described later in detail.

Figure 9:
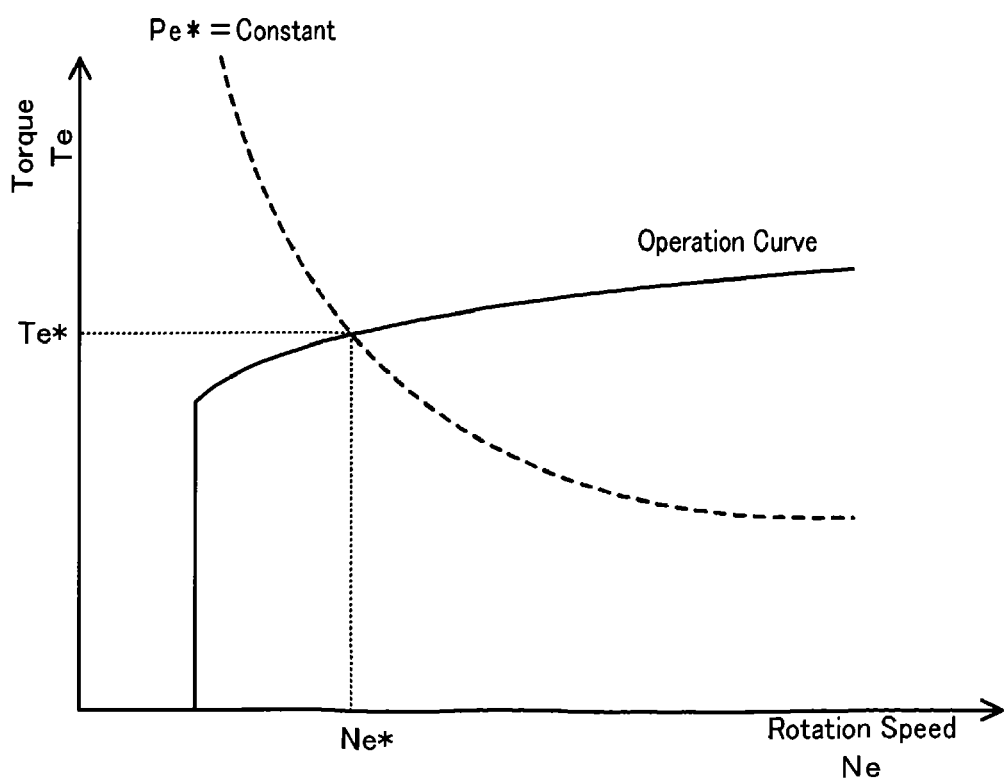
FIG. 9 shows an operation curve of an engine in the ordinary state to set a target rotation speed Ne* and a target torque Te*.

The CPU 72 sets a target rotation speed Ne* and a target torque Te* of the engine 22 according to the engine power demand Pe* (step S130) and compares the target rotation speed Ne* of the engine 22 with the minimum engine speed Nemin and the maximum engine speed Nemax of the engine 22 (step S140). When the target rotation speed Ne* is lower than the minimum engine speed Nemin (step S140), the CPU 72 limits the target rotation speed Ne* to the minimum engine speed Nemin and divides the engine power demand Pe* by the updated target rotation speed Ne* to reset the target torque Te* (step S150). When the target rotation speed Ne* is higher than the maximum engine speed Nemax (step S140), on the other hand, the CPU 72 limits the target rotation speed Ne* to the maximum engine speed Nemax and divides the engine power demand Pe* by the updated target rotation speed Ne* to reset the target torque Te* (step S160). The target rotation speed Ne* and the target torque Te* of the engine 22 are determined according to an efficient operation curve of ensuring efficient operation of the engine 22 and a curve of the engine power demand Pe*. FIG. 9 shows an efficient operation curve of the engine 22 to set the target rotation speed Ne* and the target torque Te*. As clearly shown in FIG. 9, the target rotation speed Ne* and the target torque Te* are given as an intersection of the efficient operation curve and a curve of constant engine power demand Pe* (=Ne*×Te*).

After setting the target rotation speed Ne* and the target torque Te* of the engine 22, the CPU 72 calculates a lower torque restriction Tm1min and an upper torque restriction Tm1max according to Equations (3) and (4) given below (step S170). Equations (3) and (4) are introduced by solving Equations (1) and (2) with regard to a torque Tm1 and substituting the torque Tm1 with the lower torque restriction Tm1min and the upper torque restriction Tm1max:

$$-Tm1/\rho + tm2 \cdot Gr = Tr^* \quad (1)$$

$$Win \leq Tm1 \cdot Nm1 + Tm2 \cdot Nm2 \leq Wout \quad (2)$$

$$Tm1min = (Gr \cdot Win - Tr^* \cdot Nm2)/(Gr \cdot Nm1 + Nm2/\rho) \quad (3)$$

$$Tm1max = (Gr \cdot Wout - Tr^* \cdot Nm2)/(Gr \cdot Nm1 + Nm2/\rho) \quad (4)$$

Equation (1) shows a condition that the sum of a torque applied to the ring gear shaft 32a or the driveshaft by output of a torque Tm1 from the motor MG1 and a torque applied to the ring gear shaft 32a by output of a torque Tm2 from the motor MG2 is equal to the torque demand Tr*. Equation (2) shows a condition that the sum of an amount of power generation (power consumption) by the motor MG1 and an amount of power consumption (power generation) by the motor MG2 is in a range of the input limit Win and the output limit Wout of the battery 50. The CPU 72 then calculates a tentative motor torque Tm1tmp of the motor MG1 according to Equation (5) given below (step S180):

$$Tm1tmp = k1 \cdot (Ne^* - Ne) + k2 \cdot \int (Ne^* - Ne)dt \quad (5)$$

Equation (5) is a relational expression of feedback control to make the rotation speed Ne of the engine 22 approach to the target rotation speed Ne*. A torque command Tm1* of the motor MG1 is set by limiting the calculated tentative motor torque Tm1tmp in the range of the calculated lower torque restriction Tm1min and the calculated upper torque restriction Tm1max (step S190). Equation (1) given above is a dynamic relational expression of the rotational elements included in the power distribution integration mechanism 30.

Figure 10:
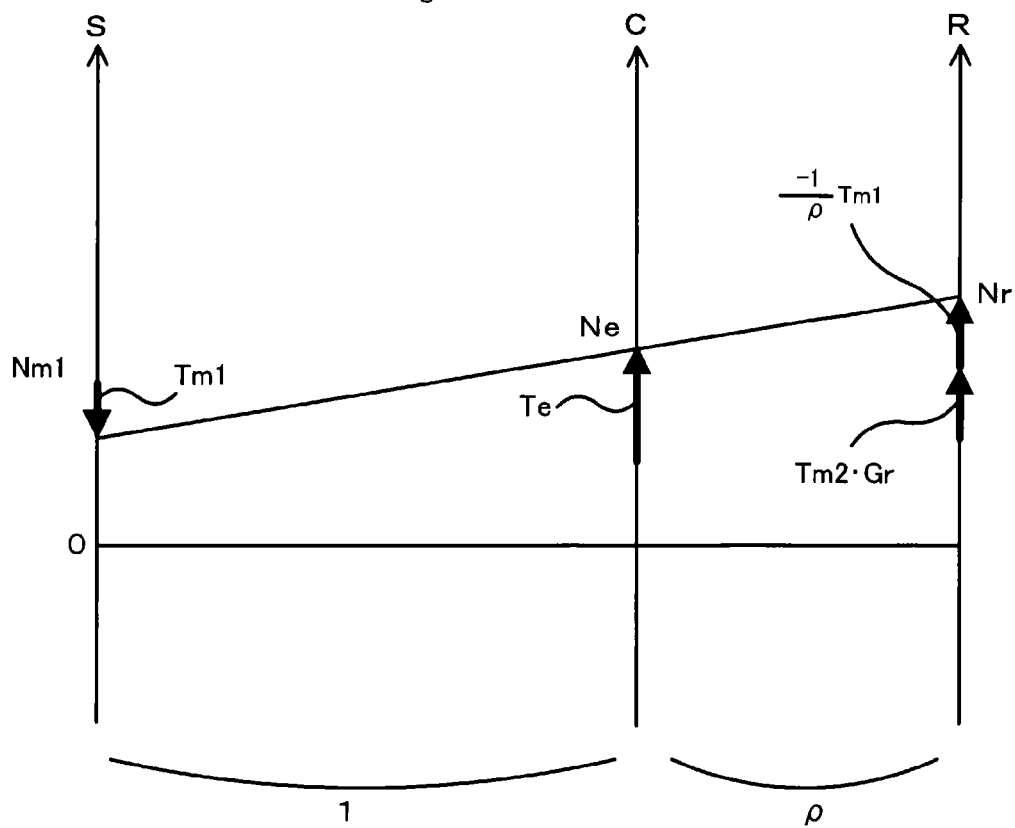
FIG. 10 is an alignment chart showing torque-rotation speed dynamics of respective rotational elements of a power distribution integration mechanism included in the hybrid vehicle of the embodiment.

FIG. 10 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a) that is equivalent to the division of the rotation speed Nm2 of the motor MG2 by the gear ratio Gr of the reduction gear 35. Two upward thick arrows on the axis 'R' in FIG. 10 respectively show a torque applied to the ring gear shaft 32a by output of the torque Tm1 from the motor MG1 and a torque applied to the ring gear shaft 32a via the reduction gear 35 by output of the torque Tm2 from the motor MG2. Equation (1) is readily introduced from the alignment chart of FIG. 10. In Equation (1), 'ρ' represents a gear ratio of the power distribution integration mechanism 30 (number of teeth of the sun gear 31/number of teeth of the ring gear 32). In Equation (5), 'k1' and 'k2' respectively denote a gain of the proportional and a gain of the integral term.

In one example, the torque command Tm1* of the motor MG1 is set on the assumption that the tentative motor torque Tm1tmp calculated at step S180 is in the range of the lower torque restriction Tm1min and the upper torque restriction Tm1max. In this case, the torque command Tm1* of the motor MG1 is equal to the torque set to make the rotation speed Ne of the engine 22 approach to the target rotation speed Ne*. Output of this torque command Tm1* from the motor MG1 causes the engine 22 to be driven at the target rotation speed Ne*. In another example, the torque command Tm1* of the motor MG1 is set on the assumption that the calculated tentative motor torque Tm1tmp is out of the range of the lower torque restriction Tm1min and the upper torque restriction Tm1max and is accordingly limited to the lower torque restriction Tm1min or to the upper torque restriction Tm1max. In this case, the torque command Tm1* of the motor MG1 is not equal to the torque set to make the rotation speed Ne of the engine 22 approach to the target rotation speed Ne*. Output of this torque command Tm1* from the motor MG1 causes the engine 22 to be driven at a rotation speed different from the target rotation speed Ne*. When the calculated tentative motor torque Tm1tmp is limited to the lower torque restriction Tm1min and the lower torque restriction Tm1min is set to the torque command Tm1*, the torque Tm1 of the motor MG1 is decreased in the alignment chart of FIG. 10. The decrease of the torque Tm1 leads to an increase in rotation speed Ne of the engine 22 over the target rotation speed Ne*. When the calculated tentative motor torque Tm1tmp is limited to the upper torque restriction Tm1max and the upper torque restriction Tm1max is set to the torque command Tm1*, the torque Tm1 of the motor MG1 is increased in the alignment chart of FIG. 10. The increase of the torque Tm1 leads to a decrease in rotation speed Ne of the engine 22 below the target rotation speed Ne*. The control procedure of this embodiment increases or decreases the rotation speed Ne of the engine 22 across the target rotation speed Ne*, so as to gain or accumulate energy from or into the rotation system including the engine 22 and the motor MG1 and thereby ensure output of the torque demand Tr* to the ring gear shaft 32a.

Referring back to the drive control routine of FIGS. 2 and 3, the CPU 72 substitutes the torque command Tm1* of the motor MG1 set as described above for the tentative motor torque Tm1tmp on the left side of Equation (5) given above and calculates back the target rotation speed Ne* of the engine 22 in Equation (5) as a back-calculated rotation speed Neb (step S200). The CPU 72 then identifies whether the value of the control flag F is equal to 0 (step S210) and compares the back-calculated rotation speed Neb with the minimum and maximum engine speeds Nemin and Nemax of the engine 22 (steps S220 and S240). The back-calculated rotation speed Neb is given as a target value of the rotation speed Ne of the engine 22 in the state of output of the torque demand Tr* to the ring gear shaft 32a or the driveshaft and output of the torque command Tm1* set in the range of the input limit Win and the output limit Wout of the battery 50 from the motor MG1. In one state, the control flag F is equal to 0 and the back-calculated rotation speed Neb is in the range of the minimum engine speed Nemin and the maximum engine speed Nemax. In this state, it is expected that output of the torque demand Tr* to the ring gear shaft 32a is attainable through input and output of energies from and to the rotation system including the engine 22 and the motor MG1 in the range of the input limit Win and the output limit Wout of the battery 50 with limitation of the rotation speed Ne of the engine 22 to the range of the minimum control rotation speed Necmin and the maximum control rotation speed Necmax. In another state, the control flag F is equal to 0 but the back-calculated rotation speed Neb is out of the range of the minimum engine speed Nemin and the maximum engine speed Nemax. In this state, it is expected that output of the torque demand Tr* to the ring gear shaft 32a is unattainable even through input and output of energies from and to the rotation system including the engine 22 and the motor MG1 in the range of the input limit Win and the output limit Wout of the battery 50 with limitation of the rotation speed Ne of the engine 22 to the range of the minimum control rotation speed Necmin and the maximum control rotation speed Necmax.

When the control flag F is equal to 0 (step S210: Yes) and when the back-calculated rotation speed Neb is in the range of the minimum engine speed Nemin and the maximum engine speed Nemax (step S220: Yes), the CPU 72 calculates a lower torque restriction Tm2min and an upper torque restriction Tm2max as minimum and maximum torques output from the motor MG2 according to Equations (6) and (7) given below (step S270):

$$Tm2\text{min} = (Win - Tm1^* \cdot Nm1)/Nm2 \quad (6)$$

$$Tm2\text{max} = (Wout - Tm1^* \cdot Nm1)/Nm2 \quad (7)$$

The lower torque restriction Tm2Tmin and the upper torque restriction Tm2Tmax are respectively given by dividing a difference between the input limit Win of the battery 50 and power consumption (power generation) of the motor MG1, which is the product of the torque command Tm1* and the current rotation speed Nm1 of the motor MG1, and a difference between the output limit Wout of the battery 50 and the power consumption (power generation) of the motor MG1 by the current rotation speed Nm2 of the motor MG2. The CPU 72 then calculates a tentative motor torque Tm2tmp to be output from the motor MG2 from the torque demand Tr*, the torque command Tm1* of the motor MG1, the gear ratio ρ of the power distribution integration mechanism 30, and the gear ratio Gr of the transmission 60 according to Equation (8) given below (step S280):

$$Tm2tmp = (Tr^* + Tm1^*/\rho)/Gr \quad (8)$$

The CPU 72 limits the tentative motor torque Tm2tmp to the range between the calculated lower torque restriction Tm2min and upper torque restriction Tm2max to set a torque command Tm2* of the motor MG2 (step S290). Setting the torque command Tm2* of the motor MG2 in this manner restricts the torque demand Tr* to be output to the ring gear shaft 32a or the driveshaft in the range of the input limit Win and the output limit Wout of the battery 50. Equation (8) is readily introduced from the alignment chart of FIG. 10. As explained previously, when the control flag F is equal to 0 and the back-calculated rotation speed Neb is in range of the minimum engine speed Nemin and the maximum engine speed Nemax, output of the torque demand Tr* to the ring gear shaft 32a is attainable in the range of the input limit Win and the output limit Wout of the battery 50 with limitation of the rotation speed Ne of the engine 22 to the range of the minimum control rotation speed Necmin and the maximum control rotation speed Necmax. The tentative motor torque Tm2tmp is set to the torque command Tm2* of the motor MG2 without limitation by the lower torque restriction Tm2min and the upper torque restriction Tm2max. Namely the calculated tentative motor torque Tm2tmp may be set to the torque command Tm2* of the motor MG2 when the control flag F is equal to 0 and the back-calculated rotation speed Neb is in range of the minimum engine speed Nemin and the maximum engine speed Nemax.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S300) and exits from the drive control routine of FIGS. 2 and 3. The engine ECU 24 receives the target rotation speed Ne* and the target torque Te* and performs intake air flow regulation, fuel injection control and ignition control of the engine 22 to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

When the control flag F is equal to 0 (step S210: Yes) but when the back-calculated rotation speed Neb is out of the range of the minimum engine speed Nemin and the maximum engine speed Nemax (step S220: No), the CPU 72 sets the performance-based minimum rotation speed Nmin and the performance-based maximum rotation speed Nmax to the minimum engine speed Nemin and the maximum engine speed Nemax and sets the control flag F to 1 (step S230). The drive control routine then returns to step S130 to set the target rotation speed Ne* and the target torque Te* of the engine 22 according to the engine power demand Pe* and repeats the subsequent processing of steps S130 to S200. At this moment, the performance-based minimum rotation speed Nmin and the performance-based maximum rotation speed Nmax, instead of the minimum control rotation speed Necmin and the maximum control rotation speed Necmax, are set to the minimum engine speed Nemin and the maximum engine speed Nemax. The target rotation speed Ne* of the engine 22 is set in the range of the performance-based minimum rotation speed Nmin and the performance-based maximum rotation speed Nmax, which is wider than the range of the minimum control rotation speed Necmin and the maximum control rotation speed Necmax. The return to step S130 after setting the performance-based minimum rotation speed Nmin and the performance-based maximum rotation speed Nmax to the minimum engine speed Nemin and the maximum engine speed Nemax thus represents a shift of the control status. In this case, the control status changes from the ordinary control mode that outputs the torque demand Tr* to the ring gear shaft 32a in the range of the rotation speed Ne of the engine 22 between the minimum control rotation speed Necmin and the maximum control rotation speed Necmax and in the range of the input limit Win and the output limit Wout of the battery 50 to the specific control mode that outputs the torque demand Tr* to the ring gear shaft 32a in the range of the rotation speed Ne of the engine 22 between the performance-based minimum rotation speed Nmin and the performance-based maximum rotation speed Nmax and in the range of the input limit Win and the output limit Wout of the battery 50.

The CPU 72 subsequently identifies whether the value of the control flag F is equal to 0 (step S210) and compares the back-calculated rotation speed Neb with the minimum and maximum engine speeds Nemin and Nemax of the engine 22 (steps S220 and S240). The control flag F is currently set equal to 1 (step S210: no). When the back-calculated rotation speed Neb is in the range of the minimum engine speed Nemin and the maximum engine speed Nemax (step S240: Yes), it is expected that output of the torque demand Tr* to the ring gear shaft 32a is attainable through input and output of energies from and to the rotation system including the engine 22 and the motor MG1 in the range of the input limit Win and the output limit Wout of the battery 50 with limitation of the rotation speed Ne of the engine 22 to the range of the performance-based minimum rotation speed Nmin and the performance-based maximum rotation speed Nmax. The CPU 72 accordingly executes the processing of and after step S270 and exits from the drive control routine of FIGS. 2 and 3. In this state, the tentative motor torque Tm2tmp is set to the torque command Tm2* of the motor MG2 without limitation by the lower torque restriction Tm2min and the upper torque restriction Tm2max.

When the back-calculated rotation speed Neb is lower than the minimum engine speed Nemin of the engine 22 (step S240), the CPU 72 sets the calculated tentative motor torque Tm1tmp to the torque command Tm1* of the motor MG1 to make the rotation speed Ne of the engine 22 approach to the minimum engine speed Nemin (step S250). The tentative motor torque Tm1tmp is calculated with substitution of the minimum engine speed Nemin for the target rotation speed Ne* in Equation (5) given above. The CPU 72 then executes the processing of and after step S270. Such setting of the torque command Tm1* of the motor MG1 effectively prevents the rotation speed Ne of the engine 22 from decreasing below the minimum engine speed Nemin or the performance-based minimum rotation speed Nmin. In this state, limitation of the tentative motor torque Tm2tmp set to the torque command Tm2* of the motor MG2 by the lower and upper torque restrictions Tm2min and Tm2max causes a torque output to the ring gear shaft 32a to be deviated from the torque demand Tr* by a change corresponding to the limitation.

When the back-calculated rotation speed Neb is higher than the maximum engine speed Nemax of the engine 22 (step S240), the CPU 72 sets the calculated tentative motor torque Tm1tmp to the torque command Tm1* of the motor MG1 to make the rotation speed Ne of the engine 22 approach to the maximum engine speed Nemax (step S260). The tentative motor torque Tm1tmp is calculated with substitution of the maximum engine speed Nemax for the target rotation speed Ne* in Equation (5) given above. The CPU 72 then executes the processing of and after step S270. Such setting of the torque command Tm1* of the motor MG1 effectively prevents the rotation speed Ne of the engine 22 from increasing above the maximum engine speed Nemax or the performance-based maximum rotation speed Nmax. In this state, limitation of the tentative motor torque Tm2tmp set to the torque command Tm2* of the motor MG2 by the lower and upper torque restrictions Tm2min and Tm2max also causes a torque output to the ring gear shaft 32a to be deviated from the torque demand Tr* by a change corresponding to the limitation.

Figure 11:
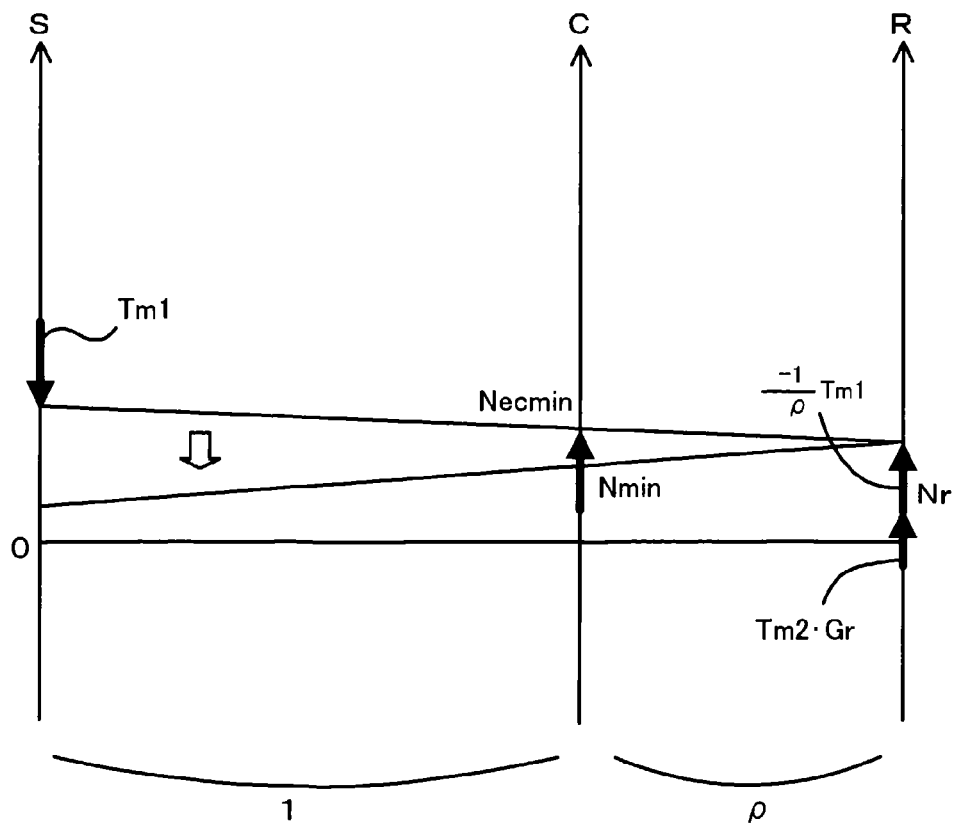
FIG. 11 is an alignment chart showing torque-rotation speed dynamics of the respective rotation elements of the power distribution integration mechanism during operation of the engine at the rotation speed close to a minimum control rotation speed Necmin.

In one example, the driver steps on the accelerator pedal 83 to abruptly increase the torque demand Tr* during the operation of the engine 22 having the rotation speed Ne limited by the minimum control rotation speed Necmin under significant restrict-ion of the output limit Wout of the battery 50 according to the temperature Tb and the state of charge SOC of the battery 50. Under significant restriction of the output limit Wout of the battery 50, the minimum control rotation speed Necmin is set to be higher than the performance-based minimum rotation speed Nmin. With an abrupt increase of the torque demand Tr*, the determination result of step S220 may be that the back-calculated rotation speed Neb is out of the range of the minimum engine speed Nemin and the maximum engine speed Nemax after the identification of the control flag F equal to 0 at step S210. In this case, the performance-based minimum rotation speed Nmin, instead of the minimum control rotation speed Necmin, is set to the minimum engine speed Nemin of the engine 22. This allows the energy extraction from the rotation system including the engine 22 and the motor MG1 in the range of the output limit Wout of the battery 50 by an amount corresponding to the rotation speed difference between the minimum control rotation speed Necmin and the performance-based minimum rotation speed Nmin. One alignment chart in this state is shown in FIG. 11. As illustrated, the rotation speed Ne of the engine 22 (equivalent to the rotation speed of the axis 'C') is decreased from the minimum control rotation speed Necmin to the performance-based minimum rotation speed Nmin. The amount of energy corresponding to this rotation speed decrease is extracted from the rotation system to adjust the output torque to the ring gear shaft 32a.

Figure 12:
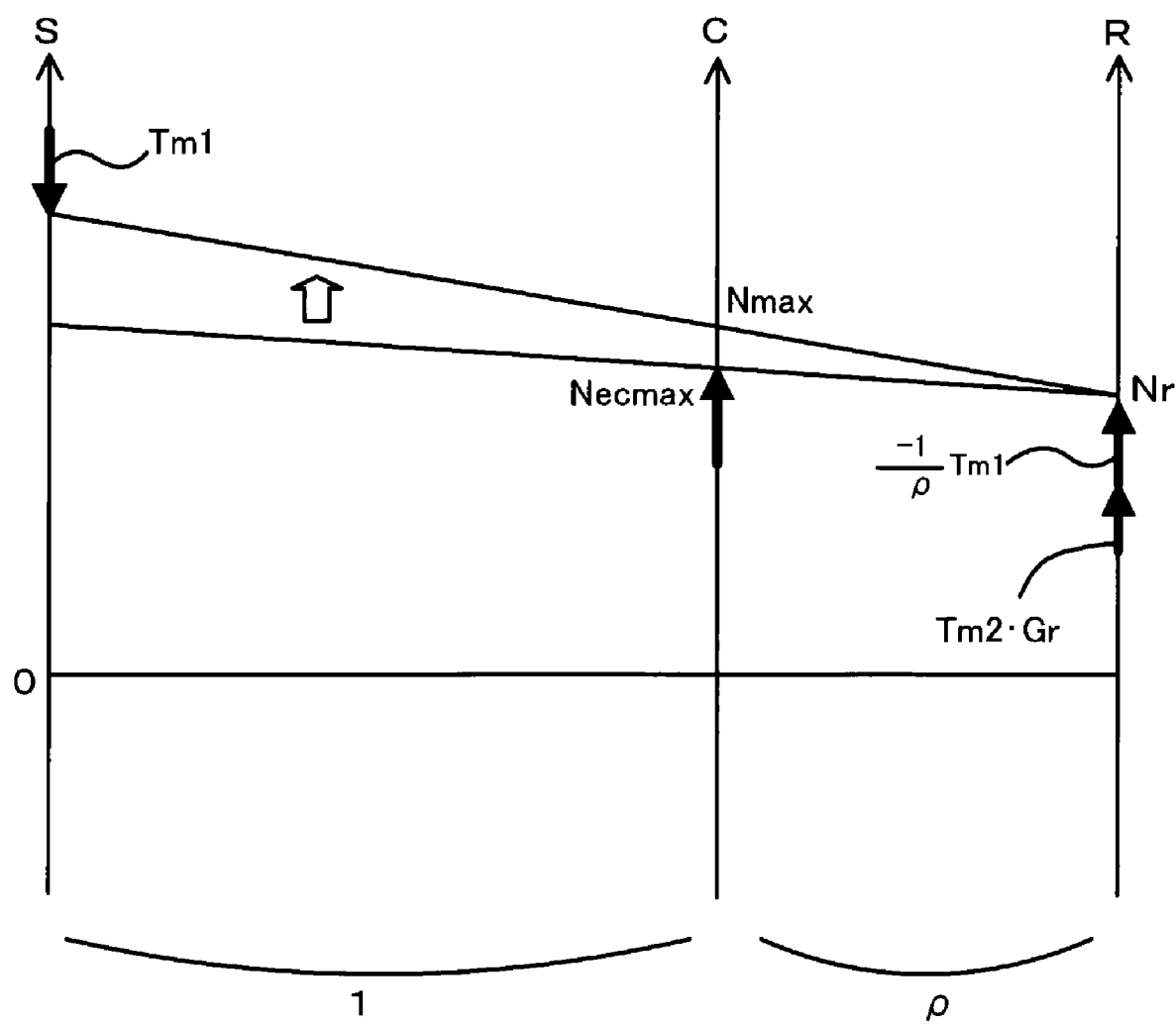
FIG. 12 is an alignment chart showing torque-rotation speed dynamics of the respective rotation elements of the power distribution integration mechanism during operation of the engine at the rotation speed close to a maximum control rotation speed Necmax.

In another example, the driver releases the stepped accelerator pedal 83 to abruptly decrease the torque demand Tr* during the operation of the engine 22 having the rotation speed Ne limited by the maximum control rotation speed Necmax under significant restriction of the input limit Win of the battery 50 according to the temperature Tb and the state of charge SOC of the battery 50. Under significant restriction of the input limit Win of the battery 50, the maximum control rotation speed Necmax is set to be lower than the performance-based maximum rotation speed Nmax. With an abrupt decrease of the torque demand Tr*, the determination result of step S220 may be that the back-calculated rotation speed Neb is out of the range of the minimum engine speed Nemin and the maximum engine speed Nemax after the identification of the control flag F equal to 0 at step S210. In this case, the performance-based maximum rotation speed Nmax, instead of the maximum control rotation speed Necmax, is set to the maximum engine speed Nemax of the engine 22. This allows the energy accumulation into the rotation system including the engine 22 and the motor MG1 in the range of the input limit Win of the battery 50 by an amount corresponding to the rotation speed difference between the performance-based maximum rotation speed Nmax and the maximum control rotation speed Necmax. One alignment chart in this state is shown in FIG. 12. As illustrated, the rotation speed Ne of the engine 22 (equivalent to the rotation speed of the axis 'C') is increased from the maximum control rotation speed Necmax to the performance-based maximum rotation speed Nmax. The amount of energy corresponding to this rotation speed increase is accumulated into the rotation system to adjust the output torque to the ring gear shaft 32a.

As described above, the hybrid vehicle 20 of the embodiment sets the minimum and maximum control rotation speeds Necmin and Necmax based on the output limit Wout and the input limit Win of the battery 50. In one example, the output of the torque demand Tr* to the ring gear shaft 32a or the driveshaft is attainable through input and output of energies from and to the rotation system including the engine 22 and the motor MG1 in the range of the input limit Win and the output limit Wout of the battery 50 with limitation of the rotation speed Ne of the engine 22 to the range of the minimum control rotation speed Necmin and the maximum control rotation speed Necmax. In this state, the drive control process performs the control to ensure output of the torque demand Tr* to the ring gear shaft 32a with limitation of the rotation speed Ne of the engine 22 to the range of the minimum control rotation speed Necmin and the maximum control rotation speed Necmax. In another state, the output of the torque demand Tr* to the ring gear shaft 32a or the driveshaft is unattainable through input and output of energies from and to the rotation system including the engine 22 and the motor MG1 in the range of the input limit Win and the output limit Wout of the battery 50 with limitation of the rotation speed Ne of the engine 22 to the range of the minimum control rotation speed Necmin and the maximum control rotation speed Necmax. In this state, the drive control process performs the control to ensure output of the torque demand Tr* to the ring gear shaft 32a with limitation of the rotation speed Ne of the engine 22 to the range of the performance-based minimum rotation speed Nmin and the performance-based maximum rotation speed Nmax, which is wider than the range of the minimum control rotation speed Necmin and the maximum control rotation speed Necmax. Even in the event of an abrupt change of the torque demand Tr* during operation of the engine 22 at the rotation speed Ne close to the minimum engine speed Nemin or the maximum engine speed Nemax under significant restriction of the output limit Wout or the input limit Win of the battery 50, this arrangement quickly responds to the abrupt change of the torque demand Tr* and ensures output of a newly required torque corresponding to the abrupt change of the torque demand Tr* to the ring gear shaft 32a. The control of the rotation speed Ne of the engine 22 in the range of the minimum control rotation speed Necmin and the maximum control rotation speed Necmax based on the output limit Wout and the input limit Win of the battery 50 effectively prepares for an abrupt change of the torque demand and thus attains a quick response to the abrupt change of the torque demand Tr*.

The hybrid vehicle 20 of the embodiment sets the minimum and maximum control rotation speeds Necmin and Necmax based on the output limit Wout and the input limit Win of the battery 50. One possible modification may set the minimum control rotation speed Necmin independently of the output limit Wout of the battery 50, while setting the maximum control rotation speed Necmax based on the input limit Win of the battery 50. Another possible modification may set the maximum control rotation speed Necmax independently of the input limit Win of the battery 50, while setting the minimum control rotation speed Necmin based on the output limit Wout of the battery 50.

Figure 13:
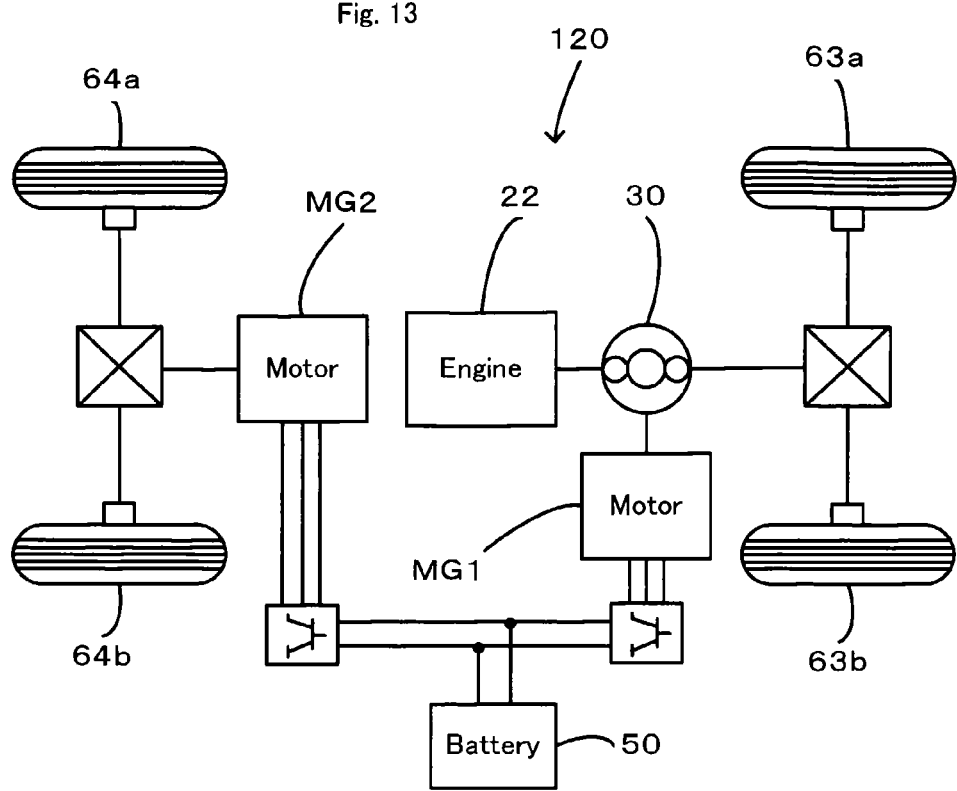
FIG. 13 schematically illustrates the configuration of another hybrid vehicle in one modified example.

In the hybrid vehicle 20 of the embodiment, the power of the motor MG2 is subjected to gear change by the reduction gear 35 and is output to the ring gear shaft 32a. In one possible modification shown as a hybrid vehicle 120 of FIG. 13, the power of the motor MG2 may be output to another axle (that is, an axle linked with wheels 64a and 64b), which is different from an axle connected with the ring gear shaft 32a (that is, an axle linked with the wheels 63a and 63b).

Figure 14:
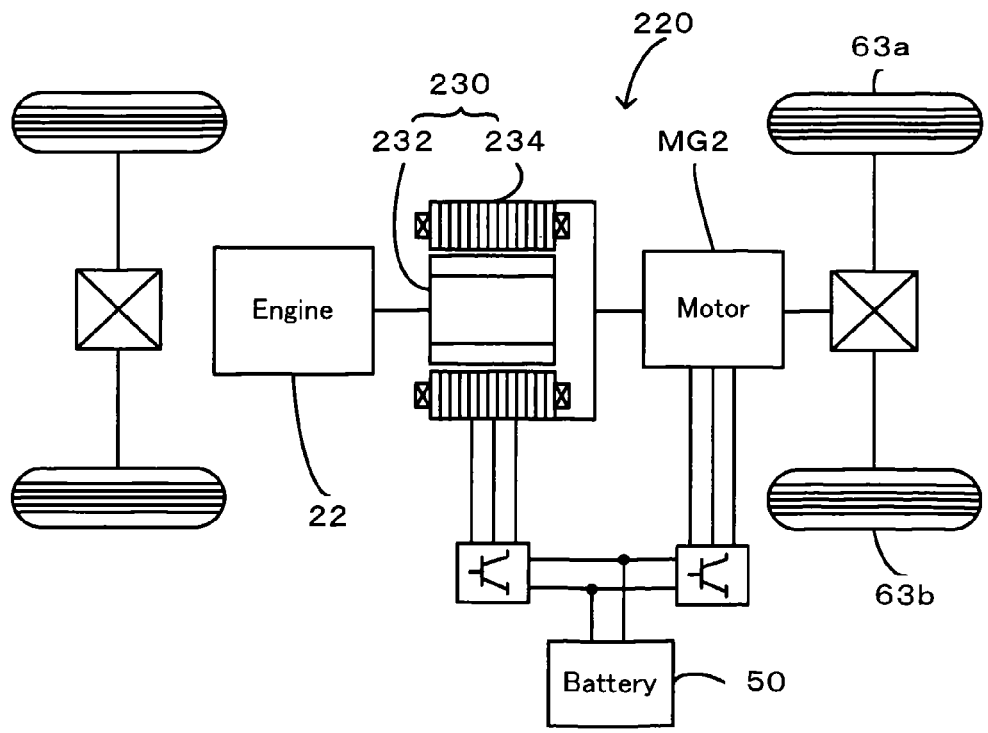
FIG. 14 schematically illustrates the configuration of still another hybrid vehicle in another modified example.

In the hybrid vehicle 20 of the embodiment, the power of the engine 22 is output via the power distribution integration mechanism 30 to the ring gear shaft 32a functioning as the drive shaft linked with the drive wheels 63a and 63b. In another possible modification of FIG. 14, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 63a, 63b and transmits part of the power output from the engine 22 to the drive shaft while converting the residual part of the power into electric power.

The application of the present invention is not restricted to the hybrid vehicles as described in the embodiment. The power output apparatus of the invention may be mounted on any of moving bodies including motor vehicles and diversity of other vehicles, boats and ships, and aircraft or may be built in stationary equipment, such as construction machines. The technique of the invention is also actualized by a control method of the power output apparatus.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applied to the manufacturing industries of power output apparatuses and motor vehicles and other relevant industries.

The invention claimed is:

1. A power output apparatus that outputs power to a driveshaft, said power output apparatus comprising:
an internal combustion engine;
an electric power-mechanical power input output mechanism that is connected with an output shaft of the internal combustion engine and with the driveshaft and inputs and outputs power from and to the output shaft and the driveshaft through input and output of electric power and mechanical power;
a motor that is capable of inputting and outputting power from and to the driveshaft;
an accumulator unit that transmits electric power to and from the electric power-mechanical power input output mechanism and the motor;
an input/output limits setting module that sets input and output limits of the accumulator unit as chargeable and dischargeable maximum and minimum electric powers in and from the accumulator unit, according to a state of charge of the accumulator unit;
a maximum/minimum control rotation speeds setting module that sets maximum and minimum control rotation speeds of the internal combustion engine as upper limit and lower limit control rotation speeds of the internal combustion engine, based on the set input and output limits of the accumulator unit;
a driving force demand specification module that specifies a driving force demand required for the driveshaft; and
a control module that, when output of the specified driving force demand to the driveshaft with a variation in rotation speed of the internal combustion engine is attainable in a control restriction range defined by the set input and output limits of the accumulator unit and the set maximum and minimum control rotation speeds, controls the internal combustion engine, the electric power-mechanical power input output mechanism, and the motor to enable the specified driving force demand to be output to the driveshaft in the control restriction range, when the output of the specified driving force demand to the driveshaft with the variation in rotation speed of the internal combustion engine is unattainable in the control restriction range, said control module controlling the internal combustion engine, the electric power-mechanical power input output mechanism, and the motor to enable a preset driving force, which depends upon the specified driving force demand, to be output to the driveshaft in a performance-based restriction range, where the performance-based restriction range is defined by the set input and output limits of the accumulator unit and performance-based maximum and minimum rotation speeds as performance-dependent upper limit rotation speed and lower limit rotation speed of the internal combustion engine, and wherein when a target rotation speed of the internal combustion engine is lower than a minimum internal combustion engine speed corresponding to the set minimum control rotation speed of the internal combustion, the control module is configured to update the target rotation speed of the internal combustion engine by limiting the target rotation speed of the internal combustion engine to the minimum internal combustion engine speed and divide an engine power demand corresponding to the target rotation speed of the internal combustion engine by the updated target rotation speed of the internal combustion engine to reset a target torque of the internal combustion engine corresponding to the target rotation speed of the internal combustion engine, and wherein when the target rotation speed of the internal combustion engine is higher than a maximum internal combustion engine speed corresponding to the set maximum control rotation speed of the internal combustion, the control module is configured to update the target rotation speed of the internal combustion engine by limiting the target rotation speed of the internal combustion engine to the maximum internal combustion engine speed and divide the engine power demand by the updated target rotation speed of the internal combustion engine so as to reset the target torque of the internal combustion engine.

2. A power output apparatus in accordance with claim 1, wherein said control module controls the internal combustion engine, the electric power-mechanical power input output mechanism, and the motor to ensure output of the driving force demand to the driveshaft with using a power input or output with a varying rotation speed of the internal combustion engine.

3. A power output apparatus in accordance with claim 1, wherein said maximum/minimum control rotation speeds setting module sets the minimum control rotation speed to increase with a decrease in absolute value of the set output limit of the accumulator unit.

4. A power output apparatus in accordance with claim 1, wherein said maximum/minimum control rotation speeds setting module sets the maximum control rotation speed to decrease with a decrease in absolute value of the set input limit of the accumulator unit.

5. A power output apparatus in accordance with claim 1, wherein said electric power-mechanical power input output mechanism comprises:

a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and a generator that inputs and outputs power from and to the rotating shaft.

6. A vehicle, said vehicle comprising:

an internal combustion engine;

an electric power-mechanical power input output mechanism that is connected with an output shaft of the internal combustion engine and with a driveshaft that is linked to an axle and inputs and outputs power from and to the output shaft and the driveshaft through input and output of electric power and mechanical power;

a motor that is capable of inputting and outputting power from and to the driveshaft;

an accumulator unit that transmits electric power to and from the electric power-mechanical power input output mechanism and the motor;

an input/output limits setting module that sets input and output limits of the accumulator unit as chargeable and dischargeable maximum and minimum electric powers in and from the accumulator unit, according to a state of charge of the accumulator unit;

a maximum/minimum control rotation speeds setting module that sets maximum and minimum control rotation speeds of the internal combustion engine as upper limit and lower limit control rotation speeds of the internal combustion engine, based on the set input and output limits of the accumulator unit;

a driving force demand specification module that specifies a driving force demand required for the driveshaft; and a control module that, when output of the specified driving force demand to the driveshaft with a variation in rotation speed of the internal combustion engine is attainable in a control restriction range defined by the set input and output limits of the accumulator unit and the set maximum and minimum control rotation speeds, controls the internal combustion engine, the electric power-mechanical power input output mechanism, and the motor to enable the specified driving force demand to be output to the driveshaft in the control restriction range, when the output of the specified driving force demand to the driveshaft with the variation in rotation speed of the internal combustion engine is unattainable in the control restriction range, said control module controlling the internal combustion engine, the electric power-mechanical power input output mechanism, and the motor to enable a preset driving force, which depends upon the specified driving force demand, to be output to the driveshaft in a performance-based restriction range, where the performance-based restriction range is defined by the set input and output limits of the accumulator unit and performance-based maximum and minimum rotation speeds as performance-dependent upper limit rotation speed and lower limit rotation speed of the internal combustion engine, and wherein when a target rotation speed of the internal combustion engine is lower than a minimum internal combustion engine speed corresponding to the set minimum control rotation speed of the internal combustion, the control module is configured to update the target rotation speed of the internal combustion engine by limiting the target rotation speed of the internal combustion engine to the minimum internal combustion engine speed and divide an engine power demand corresponding to the target rotation speed of the internal combustion engine by the updated target rotation speed of the internal combustion engine to reset a target torque of the internal combustion engine corresponding to the target rotation speed of the internal combustion engine, and wherein when the target rotation speed of the internal combustion engine is higher than a maximum internal combustion engine speed corresponding to the set maximum control rotation speed of the internal combustion, the control module is configured to update the target rotation speed of the internal combustion engine by limiting the target rotation speed of the internal combustion engine to the maximum internal combustion engine speed and divide the engine power demand by the updated target rotation speed of the internal combustion engine so as to reset the target torque of the internal combustion engine.

7. A vehicle in accordance with claim 6, wherein said control module controls the internal combustion engine, the electric power-mechanical power input output mechanism, and the motor to ensure output of the driving force demand to the driveshaft with using a power input or output with a varying rotation speed of the internal combustion engine.

8. A vehicle in accordance with claim 6, wherein said maximum/minimum control rotation speeds setting module sets the minimum control rotation speed to increase with a decrease in absolute value of the set output limit of the accumulator unit.

9. A vehicle in accordance with claim 6, wherein said maximum/minimum control rotation speeds setting module sets the maximum control rotation speed to decrease with a decrease in absolute value of the set input limit of the accumulator unit.

10. A vehicle in accordance with claim 6, wherein said electric power-mechanical power input output mechanism comprises:
   a three shaft-type power input output module that is linked to three shafts, the output shaft of the internal combustion engine, the driveshaft, and a rotating shaft, and inputs and outputs power from and to a residual one shaft based on powers input from and output to any two shafts among the three shafts; and
   a generator that inputs and outputs power from and to the rotating shaft.

11. A control method of a power output apparatus, said power output apparatus having: an internal combustion engine; an electric power-mechanical power input output mechanism that is connected with an output shaft of the internal combustion engine and with a driveshaft and inputs and outputs power from and to the output shaft and the driveshaft through input and output of electric power and mechanical power; a motor that is capable of inputting and outputting power from and to the driveshaft; and an accumulator unit that transmits electric power to and from the electric power-mechanical power input output mechanism and the motor,
   said control method comprising the steps of:
   (a) setting input and output limits of the accumulator unit as chargeable and dischargeable maximum and minimum electric powers in and from the accumulator unit, according to a state of charge of the accumulator unit, and setting maximum and minimum control rotation speeds of the internal combustion engine as upper limit and lower limit control rotation speeds of the internal combustion engine, based on the set input and output limits of the accumulator unit; and
   (b) when output of a specified driving force demand to the driveshaft with a variation in rotation speed of the internal combustion engine is attainable in a control restriction range defined by the set input and output limits of the accumulator unit and the set maximum and minimum control rotation speeds, controlling the internal combustion engine, the electric power-mechanical power input output mechanism, and the motor to enable the specified driving force demand to be output to the driveshaft in the control restriction range,
   when the output of the specified driving force demand to the driveshaft with the variation in rotation speed of the internal combustion engine is unattainable in the control restriction range, controlling the internal combustion engine, the electric power-mechanical power input output mechanism, and the motor to enable a preset driving force, which depends upon the specified driving force demand, to be output to the driveshaft in a performance-based restriction range,
   where the performance-based restriction range is defined by the set input and output limits of the accumulator unit and performance-based maximum and minimum rotation speeds as performance-dependent upper limit rotation speed and lower limit rotation speed of the internal combustion engine, and
   wherein when a target rotation speed of the internal combustion engine is lower than a minimum internal combustion engine speed corresponding to the set minimum control rotation speed of the internal combustion, the control module is configured to update the target rotation speed of the internal combustion engine by limiting the target rotation speed of the internal combustion engine to the minimum internal combustion engine speed and divide an engine power demand corresponding to the target rotation speed of the internal combustion engine by the updated target rotation speed of the internal combustion engine to reset a target torque of the internal combustion engine corresponding to the target rotation speed of the internal combustion engine, and wherein when the target rotation speed of the internal combustion engine is higher than a maximum internal combustion engine speed corresponding to the set maximum control rotation speed of the internal combustion, the control module is configured to update the target rotation speed of the internal combustion engine by limiting the target rotation speed of the internal combustion engine to the maximum internal combustion engine speed and divide the engine power demand by the updated target rotation speed of the internal combustion engine so as to reset the target torque of the internal combustion engine.

\* \* \* \* \*